Nov. 18, 1958  L. MERKER  2,860,998
METAL TITANATE COMPOSITION
Filed Nov. 29, 1955
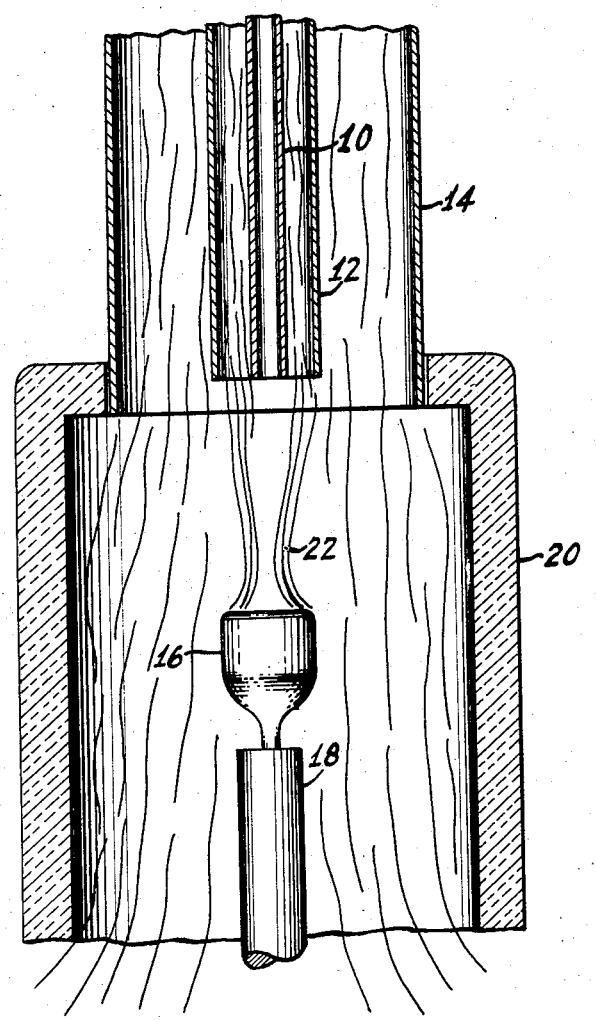
INVENTOR.
LEON MERKER
BY
AGENT 2,860,998
Patented Nov. 18, 1958

2,860,998

METAL TITANATE COMPOSITION

Leon Merker, Bronx, N. Y., assignor to National Lead Company, New York, N. Y., a corporation of New Jersey Application November 29, 1955, Serial No. 549,597

6 Claims. (Cl. 106—42)

This invention relates to metal titanate compositions. More specifically, it relates to monocrystalline titanate compositions which are highly refractive.

Many types of materials have been produced as sintered bodies which possess relatively high refractive indices. Among these sintered bodies are barium titanate. Such bodies are prepared in various ways by sintering powdered barium titanate material. Commercially significant advantages could be obtained if barium titanate could be prepared as monocrystalline material instead of in the well-known sintered form and while various techniques have been employed to produce monocrystalline barium titanate prior to our investigations, none has been productive of single crystals of any commercially useful size and, therefore, sintered titanate bodies with their inherent limitations have been used instead. During our investigations on the production of single crystals, we have attempted to produce many types of single crystals and among those which have been produced successfully is a monocrystalline tetragonal titanate composition consisting essentially of barium titanate and from about 1% to about 10% by weight of an oxidic compound selected from the group consisting of strontium and calcium, calculated as metal oxide. Such compositions are more fully described and claimed in U. S. Patent No. 2,723,916, issued November 15, 1955, to Langtry E. Lynd and Leon Merker, which is assigned to the same assignee as the instant application.

However, despite the modicum of success we have achieved in this field, the varying contingencies encountered leave room for the development of improved single crystals of barium titanate having the tetragonal structure.

An object of this invention, therefore, is to produce single titanate crystals of commercially usable size in a simple and economical manner which possess characteristics similar to those possessed by the tetragonal form of barium titanate. Another object of this invention is to provide a commercially practical process for producing such crystals. Still another object is to provide consistently uniform single crystals of barium titanate having a tetragonal crystal structure. These and other objects will become more apparent from the following more complete description of the instant invention.

Broadly, this invention contemplates monocrystalline tetragonal titanate compositions consisting essentially of barium titanate, of from about 1% to about 10% by weight of an oxidic compound selected from the group consisting of strontium and calcium, and from about 0.01% to about 0.1% by weight of an oxidic compound selected from the group consisting of manganese, iron, cobalt and nickel, calculated as metal oxides. The present invention further contemplates the preparation of such monocrystalline titanate compositions which comprises forming an intimate mixture of finely divided barium titanate, of from 1% to 10% of a compound selected from the group consisting of an oxidic compound of strontium and an oxidic compound of calcium, and from 0.01% to 0.1% of an oxidic compound selected from the group consisting of manganese, iron, cobalt and nickel, and fusing said mixture to form a monocrystalline mass in the form of a boule. The finely divided mixture may be fused in an oxyhydrogen flame.

The term "barium titanate" and "oxidic compounds of strontium, calcium, manganese, iron, cobalt and nickel" are intended to embrace both pure material and material which contains impurities, coloring or modifying agents, either present or added, and which are of a nature or in an amount as to not affect the monocrystalline structure nor alter the desired properties of the monocrystalline material produced. In most cases the impurities are held to a minimum and ordinarily will not exceed a few tenths of a percent, while the modifying and coloring agents are added in amounts necessary to produce the desired effect.

A preferred type of apparatus which may be successfully used in the instant invention is similar in its general construction to that shown in application Serial No. 286,853, filed May 9, 1952, by Charles H. Moore, Jr., et al., now abandoned, and in Belgian Patent No. 491,522.

The principal differences between the present preferred apparatus and those of the Moore application and the Belgian patent are in the relation of the burner to the chamber and the manner in which the gases are introduced. These differences are illustrated in the drawing.

In the apparatus shown in the drawing, the burner comprises three substantially concentric tubes 10, 12, and 14. The powdered titanate mixture is introduced through the center tube 10 with a portion of the oxygen, the remainder of the oxygen being introduced through the intermediate tube 12. The hydrogen is introduced through the outer tube 14 which may be slightly longer than the tubes 10 and 12. The boule 16 is formed on a pedestal 18 of suitable refractory material such as alumina or zirconia and, as the boule grows, the pedestal 18 is lowered so that the top of the boule always remains at about the same location in the flame.

The boule 16 and top of the pedestal 18 are surrounded by a chamber 20 of alumina or the like and this chamber preferably surrounds the lower end of the outer tube 14. The gases are preferably fed at such rates that the flame fills and extends through the entire chamber 20 around the boule and in this way the temperature and other conditions around the boule are kept substantially constant. It has been found that smaller flames may be unsteady due to currents within the chamber and variations in the flame may cause damage to the boule.

In practice, the powdered titanate material is generally introduced periodically into the pipe 10 with a minor portion of the oxygen, the major portion of the oxygen being introduced through pipe 12. An excess of hydrogen is introduced through the pipe 14 to provide the proper temperature and large flame. In one burner the oxygen in the inner pipe 10, the oxygen in the intermediate pipe 12, and the hydrogen in the outer pipe 14 are introduced in the proportions 3:3:13 respectively.

A cone 22 forms within the flame below the pipes 10 and 12 and the pedestal 18 is preferably positioned so that the molten top of the boule 16 is at or near the point of the cone 22. In order to start such a single crystal it is desirable, but not necessary, to first form a seed on the pedestal and then gradually build up the amount of molten material on the seed to form the crystal. Such a procedure allows the crystal to build up upon itself, gradually increasing in diameter until a boule or carrot-shaped single crystal of the titanate composition is formed. The size of the orifices of the oxygen-hydrogen torch determines the size of the intensely heated reaction zone which, in turn, determines the diameter of the carrot-shaped crystal produced.

In order to fuse the powdered mixture to form a boule it has been found that the temperature of the flame should be maintained somewhat above the melting point of the titanate feed material, but should not exceed a temperature at which the molten material tends to flow over the edges of the pool at the top of the boule. The flame temperature may be maintained by adjusting the quantity and rates of flow of both the hydrogen and oxygen gases but it is important that the flame be kept as constant and quiet as possible. The temperature should be held between about 1600° C. and 1725° C., preferably between about 1625° C. and 1700° C.

It is preferred to employ the titanate mixture in finely powdered form. The titanate mixture or feed material should be substantially free from objectionable or incompatible impurities which detrimentally affect the crystal structure, the color or other properties of the crystal, and should be finely divided and fairly uniform in size. For most efficient results, the titanate feed material should possess an open structure with units capable of being rapidly melted and a material having an ultimate unit particle size of less than 1 micron has proved especially satisfactory. Aggregates of these small particles greater than 100 mesh should be avoided as they do not tend to melt completely. The feed material should also be free-flowing in order to feed properly.

The titanate mixture is prepared by adding the calcium or strontium oxidic compounds and the manganese, iron, cobalt or nickel compounds to the barium titanate either before or after the barium titanate material is produced.

Substantially any oxidic compound of strontium, calcium, iron or manganese may be added to the titanate material provided it does not adversely affect the properties desired. The most convenient compounds to add include oxides, carbonates, or titanates of such metals. The amount of oxidic compound of either the strontium or calcium should lie between about 1% and about 10% by weight, calculated as the metal oxide. The amount of oxidic compound of manganese, iron, cobalt or nickel should lie between about 0.01% and 0.1% by weight, calculated as the metal oxide.

Using the type of feed composition contemplated by the instant invention, a series of boules were prepared from barium titanate material containing from 1% to 10% of oxides of calcium and strontium and from 0.01% to 0.1% of oxides of manganese, iron, cobalt and nickel. The single crystal tetragonal boules were formed by using an oxygen-hydrogen burner having concentric orifices, the center orifice carrying the oxygen gas and powdered titanate feed material entrained in the oxygen, the intermediate orifice carrying the rest of the oxygen gas, and the outer orifice carrying the hydrogen gas. In a typical run the total gas flow of oxygen was 9 liters per minute, 4 liters through the center orifice and 5 liters through the intermediate orifice, while the flow of hydrogen was 40 liters per minute. The resulting boules were then subsequently annealed in an oxidizing atmosphere, such as air, for example, at a temperature between 650° C. and 1550° C. to remove the strains, and the annealed boules possessed a clear and unfractured appearance. The time of annealing varied with the size of the boules and the temperature employed. However, it was found that from 12 hours to 180 hours was satisfactory for producing relatively strain-free, transparent crystals.

The boules produced by the process of the instant invention were made much more rapidly than those produced in U. S. Patent No. 2,723,916 cited above. In addition to the increased speed of growth it appeared that the powdered feed material used in the instant invention melted more readily and was easier to control in the molten state over a wider temperature range. It also appeared that a more rapid crystallization took place than that produced by U. S. Patent No. 2,723,916.

The monocrystalline tetragonal titanate compositions produced according to the instant invention had substantially the same physical properties as the crystal produced by U. S. Patent No. 2,723,916. They had an average index of refraction at 25° C. of 2.40 with a reciprocal relative dispersion below 20 and a birefringence of 0.055 at 25° C. With respect to its electrical properties, the conductivity had decreased somewhat from the conductivity of the crystal produced by the cited U. S. Patent No. 2,723,916.

From the above description, it is apparent that the present invention provides monocrystalline tetragonal titanate compositions having a high index of refraction and unusual electrical properties. These single crystals of titanate composition are massive and therefore may be used for many electrical purposes, more effectively than are obtained by using sintered barium titanate bodies. The process is simple and economical to employ to produce massive monocrystalline titanate materials. The instant process also provides for a method for producing titanate single crystals more rapidly and easily than the crystals produced by U. S. Patent No. 2,723,916.

Such a mass of monocrystalline material may be shaped for various purposes such as, for example, dielectric amplifiers, memory devices, amplitude and frequency modulators, demodulator, frequency converters, phase shifters, harmonic generators, and high quality piezoelectric devices.

While this invention has been described and illustrated by the examples shown, it is not intended to be strictly limited thereto, and other modifications and variations may be employed within the scope of the following claims.

I claim:

1. Monocrystalline tetragonal titanate composition consisting essentially of barium titanate, from about 1% to about 10% by weight of a compound selected from the group consisting of an oxidic compound of strontium and an oxidic compound of calcium calculated as the metal oxide and from about 0.01% to about 0.1% of a compound selected from the group consisting of an oxidic compound of manganese, oxidic compound of iron, oxidic compound of cobalt and oxidic compound of nickel calculated as the metal oxide, said composition being formed synthetically by crystallizing into the form of a boule a fused mixture of finely divided barium titanate and said compounds, and characterized by a clear uniform appearance and high index of refraction.

2. Composition according to claim 1 in which said composition contains an oxidic compound of strontium.

3. Composition according to claim 1 in which said composition contains an oxidic compound of manganese.

4. Composition according to claim 1 in which said composition contains an oxidic compound of iron.

5. Composition according to claim 1 in which said composition contains an oxidic compound of cobalt.

6. Composition according to claim 1 in which said composition contains an oxidic compound of nickel.

References Cited in the file of this patent

UNITED STATES PATENTS

| | | |
|---|---|---|
| 2,576,380 | Woodcock et al. | Nov. 27, 1951 |
| 2,695,239 | Oshry | Nov. 23, 1954 |
| 2,723,915 | Merker | Nov. 15, 1955 |
| 2,723,916 | Lynd et al. | Nov. 15, 1955 |

OTHER REFERENCES

Searle: Refractory Materials, 2nd ed., Griffin & Co., 1950, pp. 358 and 421.